(12) United States Patent
Stojanovski

(10) Patent No.: US 7,735,401 B2
(45) Date of Patent: Jun. 15, 2010

(54) BORING TOOL WITH ADJUSTABLE CHAMFER CUTTER

(76) Inventor: Dimitrije Stojanovski, 13300 W. Star Dr., Shelby Township, MI (US) 48315

( * ) Notice: Subject to any disclaimer, the term of this patent is extended or adjusted under 35 U.S.C. 154(b) by 0 days.

(21) Appl. No.: 12/174,368

(22) Filed: Jul. 16, 2008

(65) Prior Publication Data

US 2010/0014929 A1   Jan. 21, 2010

(51) Int. Cl.
B23B 51/08 (2006.01)
B23B 51/10 (2006.01)

(52) U.S. Cl. .................. 82/1.2; 407/45; 407/54; 408/118

(58) Field of Classification Search .......... 408/118, 408/191, 224; 407/45, 46, 54; 82/1.2
See application file for complete search history.

(56) References Cited

U.S. PATENT DOCUMENTS

| 2,661,642 | A | | 12/1953 | Marcucci |
| 2,667,795 | A | | 2/1954 | Bowen |
| 3,635,573 | A | | 1/1972 | Halpern |
| 3,794,438 | A | * | 2/1974 | Knutsson ............... 408/231 |
| 4,211,510 | A | * | 7/1980 | Hopkins ............... 408/186 |
| 4,353,670 | A | * | 10/1982 | Jorgensen ............... 408/193 |
| 4,533,285 | A | | 8/1985 | Jorgensen |
| 4,580,933 | A | | 4/1986 | Wilkins |
| 4,927,301 | A | * | 5/1990 | Reiterman ............... 408/180 |
| 5,173,013 | A | | 12/1992 | Gorse et al. |
| 5,203,856 | A | | 4/1993 | Stephens |
| 5,288,184 | A | | 2/1994 | Heule |
| 6,595,729 | B2 | * | 7/2003 | Karlsson ............... 408/118 |
| 7,090,447 | B2 | * | 8/2006 | Jager et al. ............... 408/118 |

* cited by examiner

Primary Examiner—Will Fridie, Jr.
(74) Attorney, Agent, or Firm—Steve M. Clemmons

(57) ABSTRACT

A cutting tool having a cutting portion located proximate to one end. The cutting tool including a recessed chip flute formed along the shank of the tool away from the cutting edge. The tool includes a chamfering cartridge which is clamped to the tool shank along the chip flute. The chamfering cartridge performs a chamfering or deburring operation while allowing chips from the cutting portion to pass through the flute and away from the tool and workpiece.

13 Claims, 3 Drawing Sheets

BORING TOOL WITH ADJUSTABLE CHAMFER CUTTER

FIELD OF THE INVENTION

The present invention relates to cutting tools and, more particularly, to a boring tool having a removable chamfer cutter mounted thereon.

BACKGROUND AND SUMMARY OF THE INVENTION

Currently, cutting tools used to make a hole in a workpiece typically leave a sharp edge or burr at the entry-point of the cutting tool. This edge or burr is dulled or chamfered in a later cutting operation by another tool. This later cutting operation is inefficient and increases machining time to finish the workpiece.

Several forms of chamfering structures are known for mounting a chamfer cutter to a boring tool to reduce the number of cutting operations required to finish a workpiece. Art that has addressed this problem include U.S. Pat. No. 4,533,285 issued Aug. 6, 1985 to Charles A. Jorgensen for a Cutting Attachment For Boring Tool.

The broad purpose of the present invention is to provide a boring tool having an adjustable chamfering cartridge that is mounted along the outer edge of one of the chip flutes in tool. The boring tool having a cutting edge mounted to the lower end of an elongated shank and a chip flute running along the shank away from the cutting edge. The chamfering cartridge mates with an elongated rib that includes one wall of the chip flute.

The present invention overcomes the above-referenced and other disadvantages of prior art techniques by mounting an adjustable chamfering tool to a boring tool. The chamfering tool is compact enough to maintain a clear path for cutting chips to exit the boring tool and workpiece, while remaining rigidly mounted to the boring tool.

The present invention provides a combination boring and chamfering tool that can perform two machining operations in rapid succession (or simultaneously). The chamfering cartridge is slidably adjustable along the tool's chip flute permitting a user to cut various depth holes and still chamfer/deburr those holes with the same tool.

It is an advantage of the present invention to provide a boring tool having an elongated cylindrical shank, comprising at least one bore cutting portion mounted proximate to one end of the shank. Each cutting portion including a recessed chip flute formed in the shank and running away from the cutting portion. The tool further comprises a cartridge including a chamfer cutting portion mounted to a body. The body including means for mounting the cartridge to the shank where the cartridge is adjustably coupled to a single chip flute along the chip flute.

It is another advantage of the present invention to provide a boring tool, comprising an elongated cylindrical shank, an indexable cutting insert having a cutting face and is mounted to the shank proximate to a bottom end of the shank. The shank includes a recessed chip flute adjacent to the cutting insert. The flute runs longitudinally along the shank away from the cutting insert, wherein the flute includes a first wall that is generally collateral with the cutting face. The shank also includes an elongated mounting recess that runs longitudinally along the shank. The mounting recess including a second wall that is parallel, adjacent, and coextensive to the first wall, wherein the first and second walls cooperate to define an elongated rib. The tool further comprises a chamfer cutting cartridge having a body. The cartridge including an indexable chamfering insert and means for retaining the chamfering insert to the body. The body including a pair of spaced mounting lugs extending from the body. The lugs having opposed walls which define a channel, wherein this channel receives the rib such that the first wall and second wall each abut one of the opposed walls and the chamfering insert extends beyond the cutting insert radially.

It is still another advantage of the present invention to provide a method of adapting an indexable insert boring tool to also perform a chamfering operation, the boring tool having at least one cutting insert and a chip clearance flute running away from the cutting insert along a cylindrical shank. The method comprising the steps of: forming a mounting recess in and along the shank parallel and adjacent to the flute, wherein a portion of the shank remains between the flute and mounting recess to form an elongated rib; providing a cartridge having a chamfer cutter and a pair of spaced mounting lugs defining a channel; mating the cartridge to the shank by straddling the lugs over the rib; and adjusting the chamfering cartridge along the rib such that the chamfer cutter is a desired distance from the cutting insert.

It is yet another advantage of the present invention that the chamfering cartridge abuts the shank along substantially all of the shank facing surfaces, this abutting engagement prevents cutting debris, such as chips, from jamming in the boring tool.

Still further objects and advantages of the invention will become readily apparent to those skilled in the art to which the invention pertains upon reference to the following detailed description.

BRIEF DESCRIPTION OF THE DRAWINGS

The description refers to the accompanying drawings in which like reference characters refer to like parts throughout the several views; and in which.

DETAILED DESCRIPTION OF THE INVENTION

Figure 1:
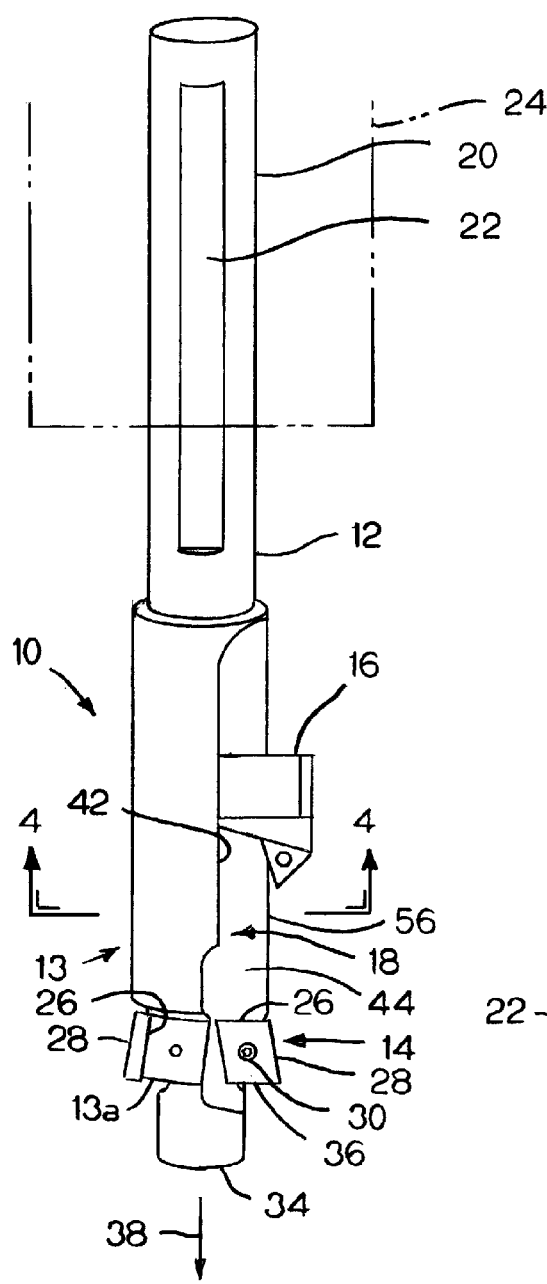
FIG. 1 illustrates a front view of a boring tool embodying the invention.
Figure 2:
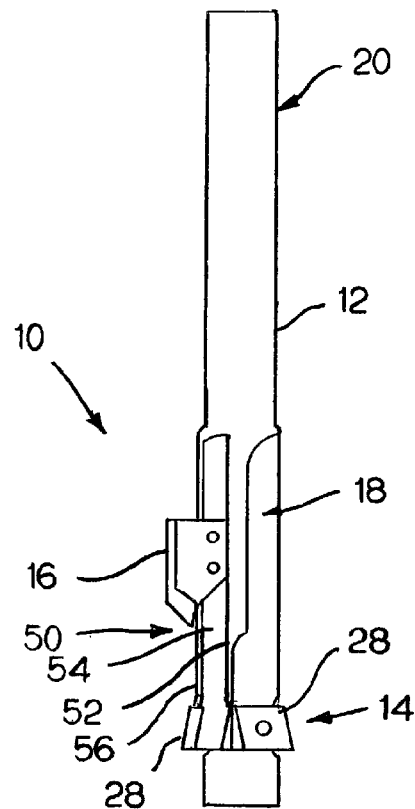
FIG. 2 is a rear view of the boring tool.

FIG. 1 illustrates a preferred cutting tool 10 used for cutting or boring a rotating workpiece 5. Tool 10 is illustrated as an exemplary cap screw counterbore used to enlarge a pre-existing hole to accommodate a screw head, however, an individual skilled in the relevant art can readily appreciate that the cutting tool 10 can take the form of substantially any other boring-type cutter, such as a boring bar.

Tool holder 10 comprises a shank 12, at least one cutting or boring portion 14 fixed proximate to the lower end 13 of the shank 12, and a chamfering cartridge 16. The shank 12 includes a recessed or cut-out chip flute 18 that both provides a relief to allow the cutting portion 14 to engage a workpiece 5 and to provide a channel to direct the cutting debris or chips resulting from a cutting operation out and away from the cutting portion 14 and tool 10. In the preferred embodiment, each cutting portion 14 has a corresponding flute 18.

The upper end 20 of tool shank 12 is cylindrical and is smaller in diameter than the lower end 13 to fit within smaller tool holders. Upper end 20 is preferably sized to be received within a common tool holder opening, such as a ½, ⅝, or ¾ inch diameter. The upper shank 20 includes an elongated flat section 22 to facilitate locking the tool 10 within a tool holder 24, shown in phantom, using conventional fasteners (not shown). The tool holder is conventional and is used in a variety of common machine tools, such as lathes and turning centers.

In the preferred embodiment, cutting portion 14 includes a recessed seat or pocket 26 adapted to receive and support a conventional indexable cutting insert 28. Insert 28 is removably mounted to pocket 26 through a conventional insert fastener, such as a lock pin 30 passing through a hole centered in cutting insert 28. It should be appreciated that pocket 26 and insert 28 are mounted proximate to the lower-most end 13a of shank 12.

In the counterbore configuration illustrated in the FIGs., the tool 10 includes a cylindrical pilot 34 extending axially from the end 13a. Pilot 34 is sized for sliding engagement within a previously drilled hole 35 in workpiece 5, which is intended to receive a particular diameter cap screw. For example, for a ⅜" diameter socket head cap screw, the nominal normal fit diameter for hole 35 is ¹³⁄₃₂", therefore the pilot 34 would be ¹³⁄₃₂", or slightly smaller, in diameter resulting in a slip-fit relationship to guide the tool 10 into hole 35.

As shown, in this counterbore embodiment, the cutting portion 14 is mounted longitudinally adjacent to the upper end of the pilot 34. Each pocket 26 and its insert 28 is positioned such that the insert's cutting edge 36 projects radially away from the longitudinal axis 38 of shank 12 and pilot 34 a certain distance to accommodate the head of a particular cap screw. From the above example, the cutting portion 14 produces an approximately ⅝" diameter counterbore to receive the head of a ⅜" cap screw. It should be appreciated that cutting edge 36 of the insert 28 is oriented relative to axis 38 to produce a substantially flat counter-bored shoulder 40.

Figure 3:
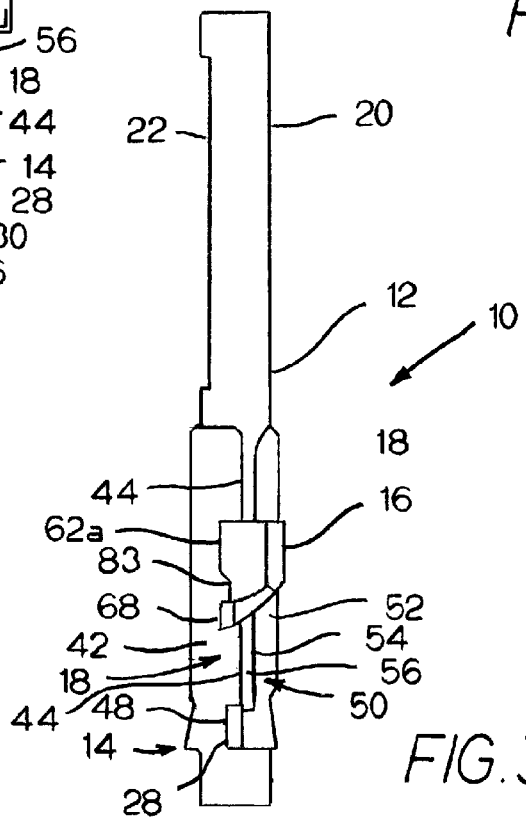
FIG. 3 is a side view of the boring tool showing the mounting rib.
Figure 5:
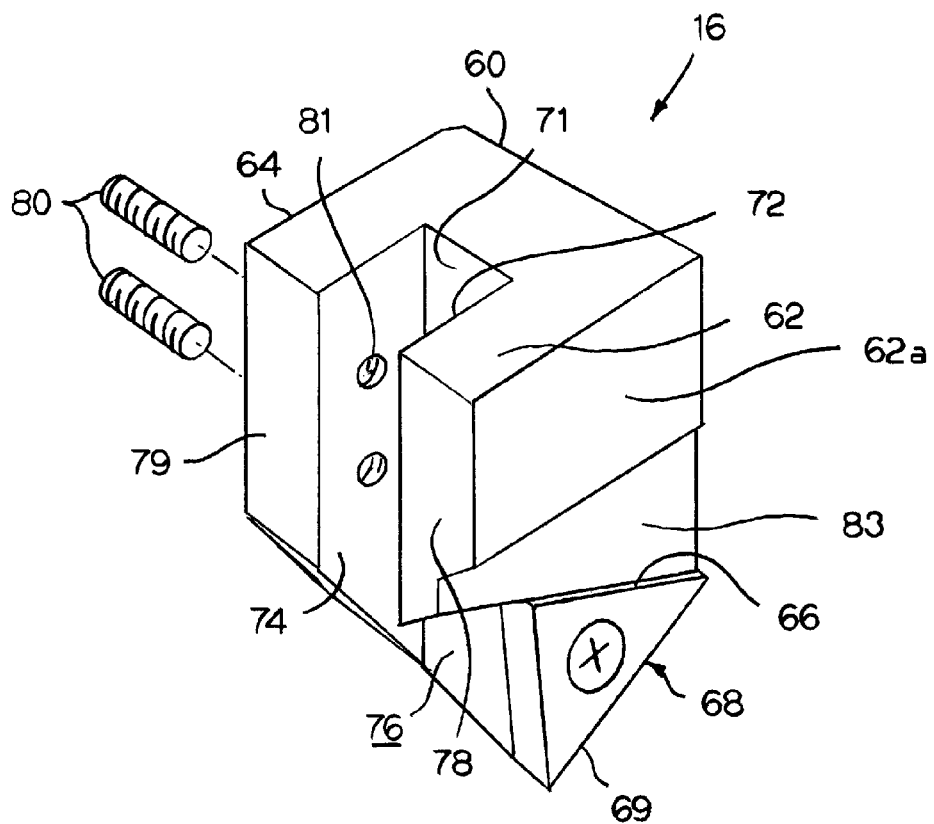
FIG. 5 is a perspective view of the chamfering cartridge.
Figure 4:
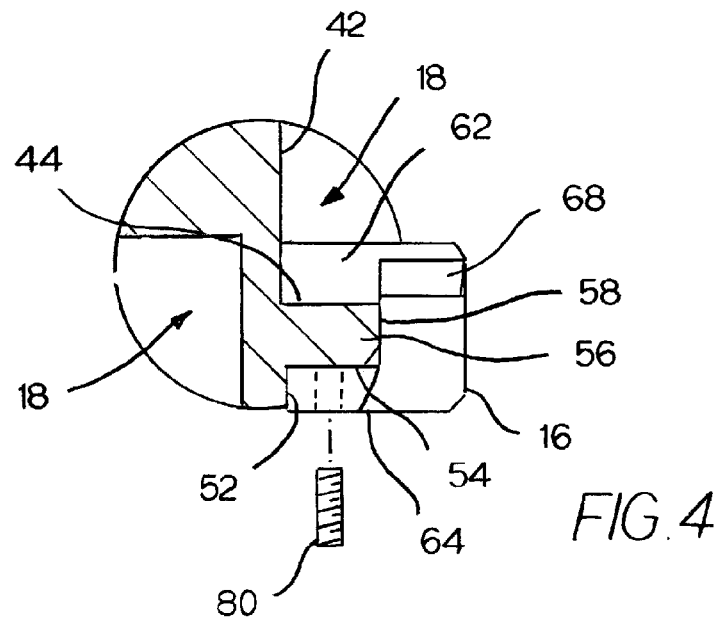
FIG. 4 is a sectional view through line 4-4 in FIG. 1.

Each cutting portion 14 includes a chip flute 18. Each chip flute 18 is a channel formed in shank 12 longitudinally adjacent to cutting portion 14. Flute 18 is defined by a pair of substantially perpendicular walls 42 and 44 that intersect proximate to axis 38 and cooperate with the counter-bored walls 45 in the workpiece to form a path for the cutting debris 46 to exit the immediate cutting area (i.e., where the insert 28 meets workpiece 5) and away from the tool 10. As shown best in FIG. 3, flute wall 44 is collateral (i.e., in the same general direction as or nearly parallel) to the cutting face 48 of the corresponding insert 28.

A mounting channel 50 is formed in the outer surface of shank 12. Channel 50 includes substantially perpendicular mounting walls 52 and 54 that longitudinally coextensive to flute walls 42, 44. Particularly, mounting wall 54 is adjacent and substantially parallel to flute wall 44, while walls 42 and 52 are substantially co-planar. As will be discussed further below, co-planar walls 42, 52 each provide a seat surface for chamfering cartridge 16.

Mounting channel 50 and flute 18 bound an elongated rib 56 formed out of the shank, which runs the longitudinal length of the chip flute 18 and channel 50. Rib 56 is substantially rectangular in cross-section, having flute wall 44 and mounting wall 54 providing two parallel side walls and a preferably flat outer wall 58 interconnecting these walls 44, 54.

Tool 10 further includes a chamfering cartridge 16. Cartridge 16 includes a body 60 and a pair of spaced mounting lugs 62, 64 projecting from body 60. Body 60 includes an insert pocket 66, which is similar in construction to pocket 26.

A conventional indexable chamfering insert 68 is mounted to pocket 66 in a conventional manner. It should be appreciated that pocket 66 and its insert 68 are located at the lower-most and outer (opposite to lugs 62, 64) portion of body 60, such that when cartridge 16 is mounted to rib 56, the cutting edge 69 of insert 68 is positioned to perform a chamfering cut to the edge 70 of the bore hole opening formed by cutting portion 14. This chamfering cut preferably forms a 30 to 60 degree chamfer around edge 70.

Lugs 62, 64 comprise a pair of rectangular projections extending from an inward face 71 of body 60. Lugs 62, 64 have opposed (i.e., facing) inner walls 72, 74. Lug walls 72 and 74 are spaced apart forming a channel 76.

Channel 76 is shaped complementary to rib 56. In the preferred embodiment, lug walls 72, 74 cooperate with face 71 to form a generally rectangular-shaped channel. Walls 72, 74 are parallel to each other and are spaced apart a distance equal to the thickness of rib 56. Lugs 62, 64 extend from face 71 a distance that is equal to the height of rib 56 (i.e., the height of walls 44, 54). Further, the inward faces 78, 79 of lugs 62, 64 are flat and depend perpendicularly away from walls 72, 74.

Chamfering cartridge 16 is mounted to shank 12 such that channel 76 is slidably mated with rib 56. The cartridge channel 76 straddles rib 56 allowing a user to adjust the position of the chamfering cartridge 16 along the elongated rib 56. When mounted to the shank, cartridge 16 is held to rib 56 with a pair of set screws 80 passing through threaded openings 81 in lug 64 into channel 76 and against mounting wall 54.

The complementary configuration of channel 76 and rib 56 results in a rigid mounting where multiple faces of the cartridge abuttingly engage the tool shank. In the preferred embodiment, a key and keyway configuration is formed where lug wall 72 abuts flute wall 44, lug wall 74 abuts mounting wall 54, lug face 78 abuts flute wall 42, lug face 79 abuts mounting wall 52. In the embodiment illustrated, cartridge body face 71 further abuts rib wall 58.

The lugs 62, 64 and front lug 62 in particular are relatively thin. Front lug 62 preferably has a thickness that is 20%-40% of the corresponding height/depth of flute wall 42. In the preferred embodiment, this thickness is further reduced by forming a recess 83 in the front face 62a of the lug 62 along the edge intended to be closest to the cutting portion 14, resulting in a stepped configuration. In this manner, the chamfering cartridge 16 only occupies a small portion of the chip flute 18, which permits cutting debris 46 to freely exit tool 10 and workpiece 5.

Figure 6:
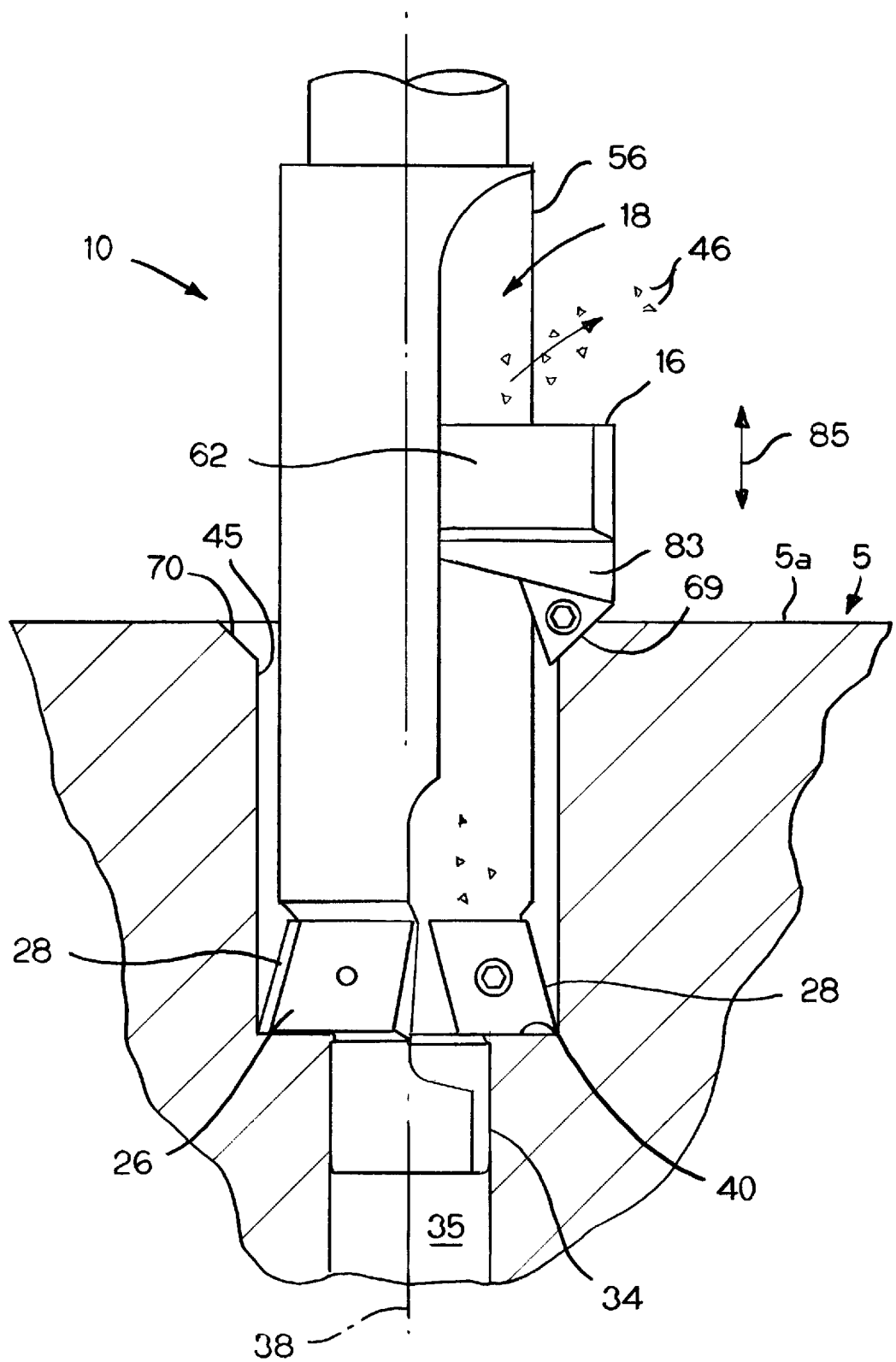
FIG. 6 is a side view of the boring tool counterboring and chamfering a workpiece.

In operation, and as best shown in FIG. 6, a workpiece 5 having a pre-drilled or bored pilot hole 35 is provided. A boring tool 10 is selected that is adapted for the particular diameter of pilot hole 35 (which is sized for a particular socket head cap screw). Once the depth of the counterbored hole is established, i.e., how far shoulder 40 is from the upper surface 5a of the workpiece, the chamfering cartridge 16 is adjusted along rib 56 in the direction of arrow 85, whereby chamfering insert 68 cuts/chamfers edge 70 as cutting insert 28 reaches a desired depth to form shoulder 40. The cartridge 16 is locked against rib 56 using set screws 80.

After the chamfering cartridge 16 is locked in place, tool axis 38 is aligned coaxially with the centerline of hole 35 and pilot 34 of tool 10 is inserted into the hole 35 and operates as a guide for the cutting portion 16. Tool 10 is inserted deeper into hole 35 such that cutting insert 28 begins cutting into workpiece 5 to counterbore/enlarge hole 35. As tool 10 continues cutting into the workpiece, chips 46 are formed. These chips 46 pass by the relatively thin profile of the portion (front lug 62) of the cartridge 16 that is contained within the chip flute 18.

The depth-adjusted chamfering edge 69 begins to cut the chamfer into hole edge 70 as the cutting portion 14 nears the proper depth. Once cutting portion 14 is at the proper depth to form shoulder 40, cutting edge 69 of insert 68 has finished cutting the desired chamfer to size/depth. The tool 10 is then removed from the workpiece 5 leaving a counterbored and chamfered workpiece from a single cutting tool.

From the foregoing description, one skilled in the art will readily recognize that the present invention is directed to a cutting tool having an adjustable and removable chamfer cutting cartridge mounted along the tool. While the present invention has been described with particular reference to various preferred embodiments, one skilled in the art will recognize from the foregoing discussion and accompanying drawings that changes, modifications and variations can be made in the present invention without departing from the spirit and scope thereof.

The invention claimed is:

1. A boring tool having an elongated cylindrical shank, comprising:
    at least one bore cutting portion mounted proximate to one end of the shank, each cutting portion including an elongated recessed chip flute formed in said shank and running away from the cutting portion; and
    a cartridge including a chamfer cutting portion mounted to a body, said body including means for mounting the cartridge to the shank where said cartridge is adjustably coupled to a single chip flute along said chip flute;
    wherein said cartridge mounting means comprises a pair of opposed walls extending from said body and which cooperate to define a channel, wherein a wall of said single chip flute is received within and abuts against one of said channel walls;
    wherein said shank further includes an elongated mounting recess having an elongated mounting wall that is adjacent to and coextensive with said flute wall, wherein said flute wall and said mounting wall cooperate to define an elongated rib, wherein said rib is receivable within said channel.

2. A boring tool as defined in claim 1, wherein said rib is complementarily-shaped with said channel.

3. A boring tool as defined in claim 1, wherein said flute wall and mounting walls are parallel.

4. A boring tool as defined in claim 1, wherein said chamfer cutting portion is an indexable cutting insert, said cartridge including means for seating and retaining said insert, wherein said seat means is located at a bottom-most end of said body.

5. A boring tool as defined in claim 1, further comprising at least one set screw passing through a threaded opening in said body and into said channel and is effective to clamp said cartridge to said shank.

6. A boring tool as defined in claim 1, wherein said boring tool is a counterbore.

7. A boring tool, comprising:
    an elongated cylindrical shank;
    an indexable cutting insert having a cutting face, said cutting insert being mounted to said shank proximate to a bottom end of said shank;
    said shank including a recessed chip flute adjacent to said cutting insert, said flute running longitudinally along said shank away from said cutting insert, wherein said flute includes a first wall that is generally collateral with said cutting face;
    said shank also including an elongated mounting recess that runs longitudinally along said shank, said mounting recess including a second wall that is parallel, adjacent, and coextensive to said first wall, said first and second walls cooperatively define an elongated rib; and
    a chamfer cutting cartridge having a body, said cartridge including an indexable chamfering insert and means for retaining said chamfering insert to said body, said body including a pair of spaced mounting lugs that extend from said body, said lugs having opposed walls which define a channel;
    wherein said channel receives said rib such that said first wall and second wall each abut one of said opposed walls and said chamfering insert extends beyond said cutting insert radially.

8. A boring tool as defined in claim 7, wherein said flute and said mounting recess are further defined by a pair of co-planar seat walls, said flute seat wall depends perpendicularly from said first wall, while said mounting recess seat wall is depends perpendicularly from said second wall.

9. A boring tool as defined in claim 8, wherein each of said mounting lugs further abuts one of said seat walls.

10. A boring tool as defined in claim 7, wherein said rib has a generally rectangular cross-sectional shape.

11. A method of adapting an indexable insert boring tool to also perform a chamfering operation, the boring tool having at least one cutting insert and a chip clearance flute running away from said cutting insert along a cylindrical shank, comprising the steps of:
    forming a mounting recess in and along said shank parallel and adjacent to said flute, wherein a portion of the shank remains between the flute and mounting recess to form an elongated rib;
    providing a cartridge having a chamfer cutter and a pair of spaced mounting lugs defining a channel;
    mating the cartridge to the shank by straddling the lugs over the rib; and
    adjusting the cartridge along the rib such that the chamfer cutter is a desired distance from said cutting insert.

12. The method of claim 11, wherein said step of providing a cartridge comprises the step of causing said channel to be complementary in shape to said rib.

13. The method of claim 11, wherein said rib is generally rectangular in shape, further comprising the step of abutting said cartridge channel against two walls of said rib and against said shank.

* * * * *